United States Patent [19]
Lee et al.

[11] Patent Number: 6,138,132
[45] Date of Patent: Oct. 24, 2000

[54] HIGH SPEED ROM-BASED NYQUIST FIR FILTER

[75] Inventors: Seong Bong Lee; In Kang; Kwang Il Yeon; Kyung Soo Kim, all of Daejeon, Rep. of Korea

[73] Assignees: Electronics and Telecommunications Research Institute, Daejeon; Korea Telecom, Seoul, both of Rep. of Korea

[21] Appl. No.: 09/097,804

[22] Filed: Jun. 16, 1998

[30] Foreign Application Priority Data

Jun. 16, 1997 [KR] Rep. of Korea .................... 97-24949

[51] Int. Cl.[7] .................................................. G06F 17/10
[52] U.S. Cl. .......................................... 708/313; 708/319
[58] Field of Search ................................ 708/313, 319; 375/298

[56] References Cited

U.S. PATENT DOCUMENTS

| | | | |
|---|---|---|---|
| 5,285,479 | 2/1994 | Iwane ........................................ | 375/298 |
| 5,379,242 | 1/1995 | Rose et al. ............................... | 708/319 |
| 5,487,089 | 1/1996 | Misaizu et al. .......................... | 708/319 |
| 5,966,314 | 10/1999 | Lee .......................................... | 708/313 |

*Primary Examiner*—David H. Malzahn
*Attorney, Agent, or Firm*—Antonelli, Terry, Stout & Kraus, LLP

[57] ABSTRACT

A high speed ROM-based Nyquist FIR filter which is capable of enhancing a modulation speed without increasing the operational frequency of the filter by overcoming the problems encountered in the conventional digital modulation ROM-based FIR filter. Therefore, it is possible to increase the modulation speed by the interpolation ratio without increasing the operational frequency of the filter compared to the method of using a conventional FIR filter using one ROM. Accordingly, the high speed ROM-based Nyquist FIR filter according to the present invention is well adaptive to the modulation FIR filter of a broadband digital communication which requires a high speed data processing capability.

4 Claims, 5 Drawing Sheets

INVERTED SIGNAL LINE

HIGH SPEED ROM-BASED NYQUIST FIR FILTER

BACKGROUND OF THE INVENTION

1. Field of the Invention

The present invention relates to a high speed ROM (Read Only Memory)-based Nyquist FIR (Finite Impulse Response) filter, and in particular, to an improved high speed ROM-based Nyquist FIR filter which is capable of enhancing a modulation speed without increasing an operational frequency of a filter by increasing the number of output signals from each ROM by providing two ROMs each having a predetermined size which is half the size of a conventional ROM, differently from a conventional filter-based method which uses one ROM.

2. Description of the Conventional Art

Generally, the digital modulation Nyquist FIR filter is a FIR filter having a T-tap 1:N interpolation ratio and creates a N-number of filter output signals. Therefore, the operational frequency of the filter becomes N-time of the input data speed. In the case of the broadband digital communication, since the input data speed is greatly increased as a band is expanded, a filter is configured such that a high speed modulation is obtained. The conventional filter construction for a high speed processing mainly uses a transversal structure method. However, this method has a disadvantage in that many circuits are used. In order to overcome the above-described problem, a filter using a ROM is used for reducing the number of circuits and enabling a high speed processing. Therefore, it is possible to reduce the size of the ROM by using the characteristic of the filter. A method is disclosed to reduce the size of the ROM using the characteristic of the filter from $Nx2^{T/N}$ to $Nx2^{T/2N-1}$. As shown in FIG. 1, the above-described method is directed to a circuit of a 48-tap 1:4 interpolation FIR filter (T=48, N=4). The basic principle used in the conventional art may be expressed as the following mathematic equation (matrix) 1 of the filter. In the final matrix shown in the mathematic equation 1, the filter coefficients C( 24), ..., C(47) are substituted with C(23), ..., C(0) using a symmetric characteristic of the filter coefficient of C(k) =C(47−k), and each row of the second coefficient matrix and a data vector is formed in the reverse order, and the matrix is formed using a characteristic that D(m)=±1 of an NRZ (Non-Return-to-Zero) signal.

[Mathematic Equation (Matrix) 1]

$$\begin{pmatrix} Y(4m) \\ Y(4m+1) \\ Y(4m+2) \\ Y(4m+3) \end{pmatrix} = \begin{pmatrix} C(0)C(4) \ldots C(20) \\ C(1)C(5) \ldots C(21) \\ C(2)C(6) \ldots C(22) \\ C(3)C(7) \ldots C(23) \end{pmatrix} \begin{pmatrix} D(m) \\ D(m-1) \\ \ldots \\ D(m-5) \end{pmatrix} +$$

$$\begin{pmatrix} C(24)C(28) \ldots C(44) \\ C(25)C(29) \ldots C(45) \\ C(26)C(30) \ldots C(46) \\ C(27)C(31) \ldots C(47) \end{pmatrix} \begin{pmatrix} D(m-6) \\ D(m-7) \\ \ldots \\ D(m-11) \end{pmatrix} =$$

$$D(m) \times \begin{pmatrix} \begin{pmatrix} C(4)C(8) \ldots C(20) \\ C(5)C(9) \ldots C(21) \\ C(6)C(10) \ldots C(22) \\ C(7)C(11) \ldots C(23) \end{pmatrix} \begin{pmatrix} D(m) \times D(m-1) \\ D(m) \times D(m-2) \\ \ldots \\ D(m) \times D(m-9) \end{pmatrix} + \begin{pmatrix} C(0) \\ C(1) \\ C(2) \\ C(3) \end{pmatrix} \end{pmatrix} +$$

$$D(m-11) \times$$

$$\begin{pmatrix} \begin{pmatrix} C(7)C(11) \ldots C(20) \\ C(5)C(9) \ldots C(21) \\ C(6)C(10) \ldots C(22) \\ C(5)C(9) \ldots C(21) \\ C(4)C(8) \ldots C(20) \end{pmatrix} \begin{pmatrix} D(m-11) \times D(m-10) \\ D(m-11) \times D(m-9) \\ \ldots \\ D(m-11) \times D(m-6) \end{pmatrix} + \begin{pmatrix} C(3) \\ C(2) \\ C(1) \\ C(0) \end{pmatrix} \end{pmatrix}$$

where, C(k)=C(47−k) and D(m)=±1

Since the second coefficient matrix of the mathematic equation 1 is identical to the first row except the order of the row, it is known that it is possible to compute the output of the filter based on the mathematic equation 1 using one ROM storing all results of the first coefficient matrix. Since the number of data which is multiplied by the coefficient matrix is 5, a ROM block is needed for storing the results of $2^5$ for each row computation. Therefore, the size of the entire ROM is $4 \times 2^5$ ($=Nx2^{T/2N-1}$ if T=48, N=4). This means that the size of the entire ROM is relatively small compared with the size ($4 \times 2^2$) of the ROM used for the filter based on a conventional ROM.

The circuits shown in FIG. 1 will be explained in more detail with reference to the mathematic equation 1. First, 12 channel data are shifted at a predetermined interval in the first and second shift registers 10 and 11 of two 6-bit which are connected in series. A multiplexer 20 selects a 6-bit data stored in the first shift register 10 when a selection signal line is 0 and selects data stored in the second shift register 11 when a selection signal line is 1 in the reverse order, respectively. The reason for selection in the reverse order is that the data with respect to the second coefficient matrix of the mathematic equation 1 should be inputted in the reverse order. 5-bit data except the most significant bit (MSB) among the 6-bit selected data form a lower address of the ROM 30. An XOR gate group 50 is used for inverting the lower address of the ROM when the most significant bit is 1. Namely, this corresponds to D(m)×D(m−k) in the data vector of the mathematic equation 1. The upper address 2-bit (=log(N=4)) of the ROM 30 is generated by the XOR gate group 70. The thusly generated upper address is used for selecting an internal block of the ROM storing the internal result with respect to each row of the coefficient matrix. The order of the selection is (0,3), (1,2), (2,1), (3,0). In addition, the order thereof is expressed in the binary digits as follows: (00, 11), (01, 10), (10, 01), (11, 00). The inverted signal is generated by the selection signal line of the multiplexer 20. Therefore, when the selection signal line is 0, the internal result with respect to the (k)th ROM block is read from the ROM 30 with respect to the data from the first shift register 10 and is stored into the intermediate register 80. The internal result with respect to the (3−k)th row and the intermediate result stored in the register 80 are added with respect to the data which is obtained by changing the selection signal line to 1, for thus outputting one output value. The above-described steps are repeated by a predetermined number corresponding to the result of four interpolations, and the input shift register is shifted by one (1) bit. The XOR gate group 60 operates to invert the output signal from the ROM when the most significant bit selected by the multiplexer 20 is 1. Namely, the above-described operation is performed identically to an operation that 1's complement is obtained with respect to the internal result. Namely, since 1 is added by the input carry of the adder 40, 2's complement is obtained. In FIG. 1, it is possible to implement a small size circuit by reducing the number of ROMs used. However, in order to compute one filter output, the ROM should be read twice, so that the processing speed is reduced by ½ compared to the conventional ROM-based filter circuit. In addition, the delay time which is required for the entire circuit including the delay time for the adder is significantly increased. Therefore, when increasing the operational frequency of the filter for a high speed processing, the hardware is expensive since the high performance ROM and adder should be used in order to reduce the delay time of the ROM and adder.

SUMMARY OF THE INVENTION

Accordingly, it is an object of the present invention to provide a high speed ROM-based Nyquist FIR filter which overcomes the aforementioned problems encountered in the conventional art.

It is another object of the present invention to provide an improved high speed ROM-based Nyquist FIR filter which is capable of enhancing a modulation speed without increasing the operational frequency of the filter by overcoming the problems encountered in the conventional digital modulation ROM-based FIR filter.

To achieve the above objects, there is provided a high speed ROM-based Nyquist FIR filter which includes a wave form generator for dividing an input clock signal and generating a control clock signal, shift registers connected in series with each other for shifting a data inputted in accordance with the control clock signal, a first multiplexer for crossingly selecting the output data shifted by the shift registers in accordance with the control clock signal, first exclusive OR circuits for selectively inverting an address of each ROM in accordance with the inverted control signal selected by the first multiplexers, two ROMs the size of each of which is divided into a size which is half of the size of $N \times 2^{T/2N-1}$ in order to increase the number of outputs from the ROM, second exclusive OR circuits for selectively inverting an internal result with respect to a row of a coefficient matrix stored in each ROM in accordance with the inverted control signal selected by the first multiplexers, an N/2 number of adders for receiving internal results of two groups which is concurrently read from each ROM selected by the second exclusive OR circuits and computing an N/2 number of series filter outputs at a time, an output register for temporarily storing the computed filter outputs, a third exclusive OR circuit for outputting a signal in order to sequentially select the filter outputs based on a logic combination of a control signal which is used for selecting a clock signal which is obtained by dividing a clock from the wave form generator and an output from the first multiplexer, and a second multiplexer for sequentially outputting filter outputs stored in the output register in accordance with a selection signal from the third exclusive OR circuit, wherein ROMs include a first ROM for increasing the output by N/2 time by parallely combining the outputs of N/2 ROM blocks, and a second ROM for increasing the outputs by N/2 time by reversely combining the outputs of the remaining N/2 ROM blocks.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The construction of the high speed ROM-based Nyquist FIR filter according to the present invention will be explained with reference to the 48-tap 1:4 interpolation filter and the accompanying drawings.

The mathematic equation (matrix) 2 may be expressed as follows by expressing the function by which the value corresponding to the (k)th row of the coefficient row is added to the coefficient C(K) value in order to simplify the mathematic equation 1.

[Mathematic equation 2]

$$Y(4m)=D(m) \times IP^0(GD(D$$
$$(m), 1,5))+D(m-11) \times IP^3(GD(D(m-11),10,6))$$
$$Y(4m+1)=D(m) \times IP^1(GD(D(m),1,5))+D(m-11)$$
$$\times IP^2(GD(D(m-11),10,6))$$
$$Y(4m+2)=D(m) \times IP^2(GD(D(m),1,5))+D(m-11) \times$$
$$IP^1(GD(D(m-11),10,6))Y$$
$$(4m+3)=D(m) \times IP^3(GD(D(m),1,5))+D(m-11)$$
$$\times IP^0(GD(D(m-11),10,6))$$

where $GD(D(m),j,k)$ denotes $D(m) \times D((m-j), \ldots, D(m) \times D(m-k)$.

In the mathematic equation 2, the output value of the filter is computed by ($IP^0$, $IP^3$) or ($IP^1$, $IP^2$). Therefore, if each function $IP^k$ is implemented by the ROM block $ROM^k$, the $ROM^0$ and $ROM^1$ ($ROM^2$ and $ROM^3$) may be combined in parallel since the pair have identical inputs, and they are not used at same time. Namely, if two ROMs, the size of each of which is ½ time the size of one ROM which is used in the conventional art and the capacity of the output of which is increased twice, are used, it is possible to concurrently compute neighboring two filter outputs using two adder, since four time internal results from the ROMs are concurrently provided with respect to one input data. Therefore, if two outputs are stored and outputted one by one, the operational frequency of the filter is reduced by ½ at the identical output speed. Namely, in the case that two time modulation speed is needed, since it is not needed to increase the operational frequency of the filter two time, it is not needed to use a high speed ROM and an adder, which are expensive.

Figure 3:
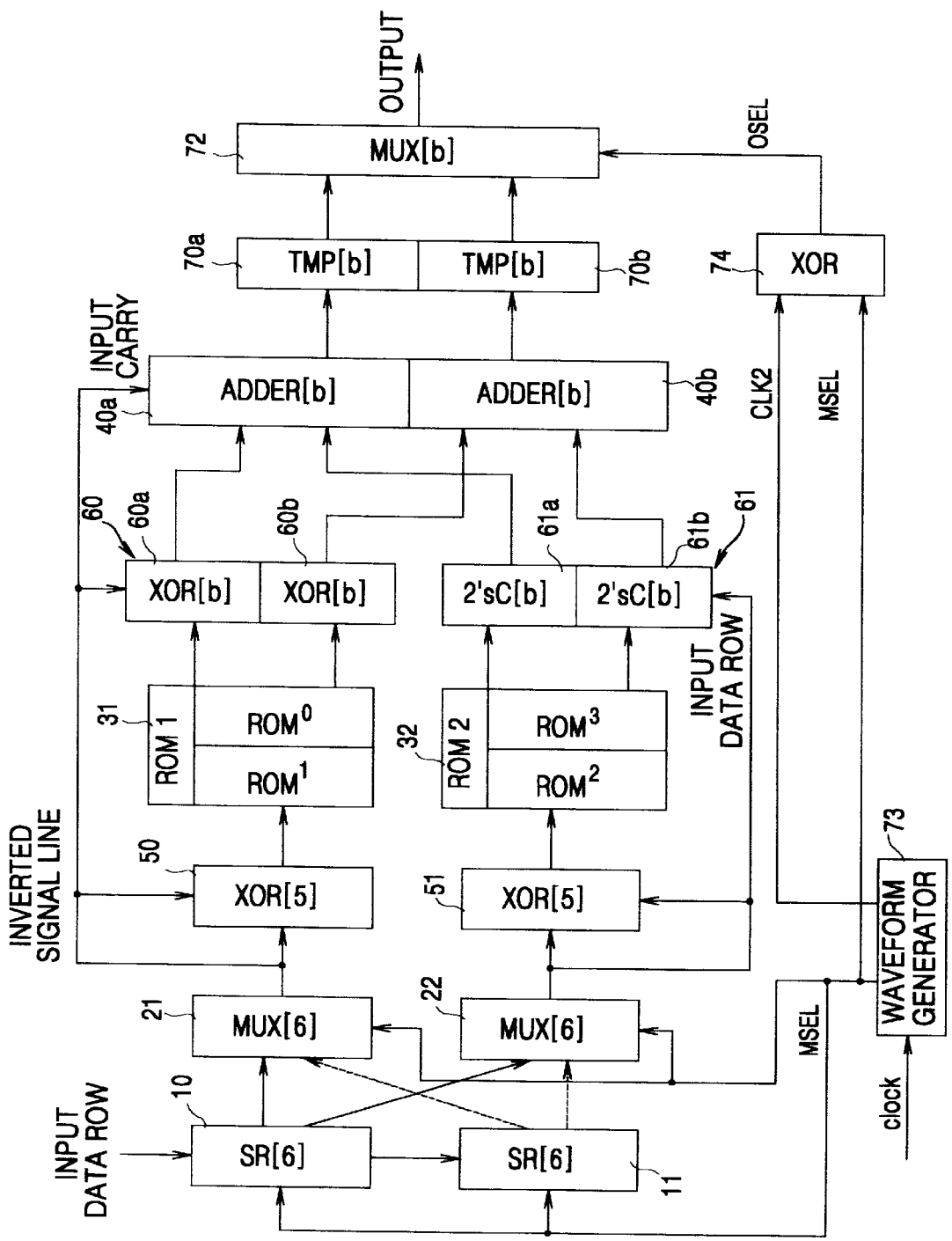
FIG. 3 is a block diagram illustrating a 48-tap 1:4 interpolation Nyquist FIR filter according to a second embodiment of the present invention.

FIG. 3 is a block diagram illustrating a 48-tap 1:4 interpolation Nyquist FIR filter according to a second embodiment of the present invention.

Figure 1:
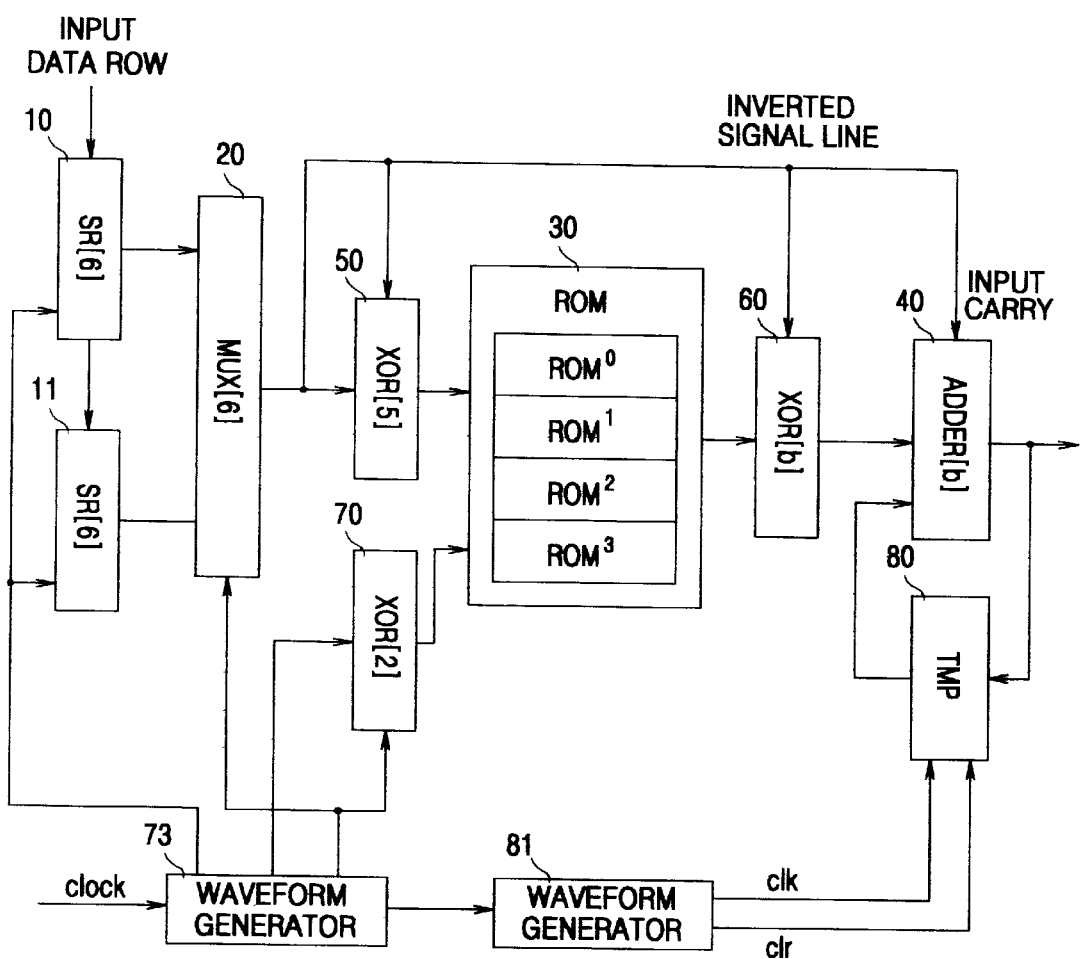
FIG. 1 is a block diagram illustrating a 48-tap 1:4 interpolation Nyquist FIR filter in the conventional art.

ROM 31 is configured by parallely combining ROM$^0$ and ROM$^1$, and ROM 32 is configured by parallely combining ROM$^3$ and ROM$^2$. The data inputted into two 6-bit shift registers 10 and 11 are inputted through the multiplexers 21 and 22, and the internal results of two groups which are concurrently read from each ROM are computed at a time by two adders 40a and 40b and stored in two output registers 70a and 70b and then sequentially outputted by the output multiplexer 72. Therefore, the modulation speed is increased four time compared to the conventional method shown in FIG. 1. Identically to the example shown in FIG. 1, the XOR gate groups 60a and 60b are used for selecting the internal results with respect to the row of the coefficient matrix stored in the ROM 31.

Figure 4:
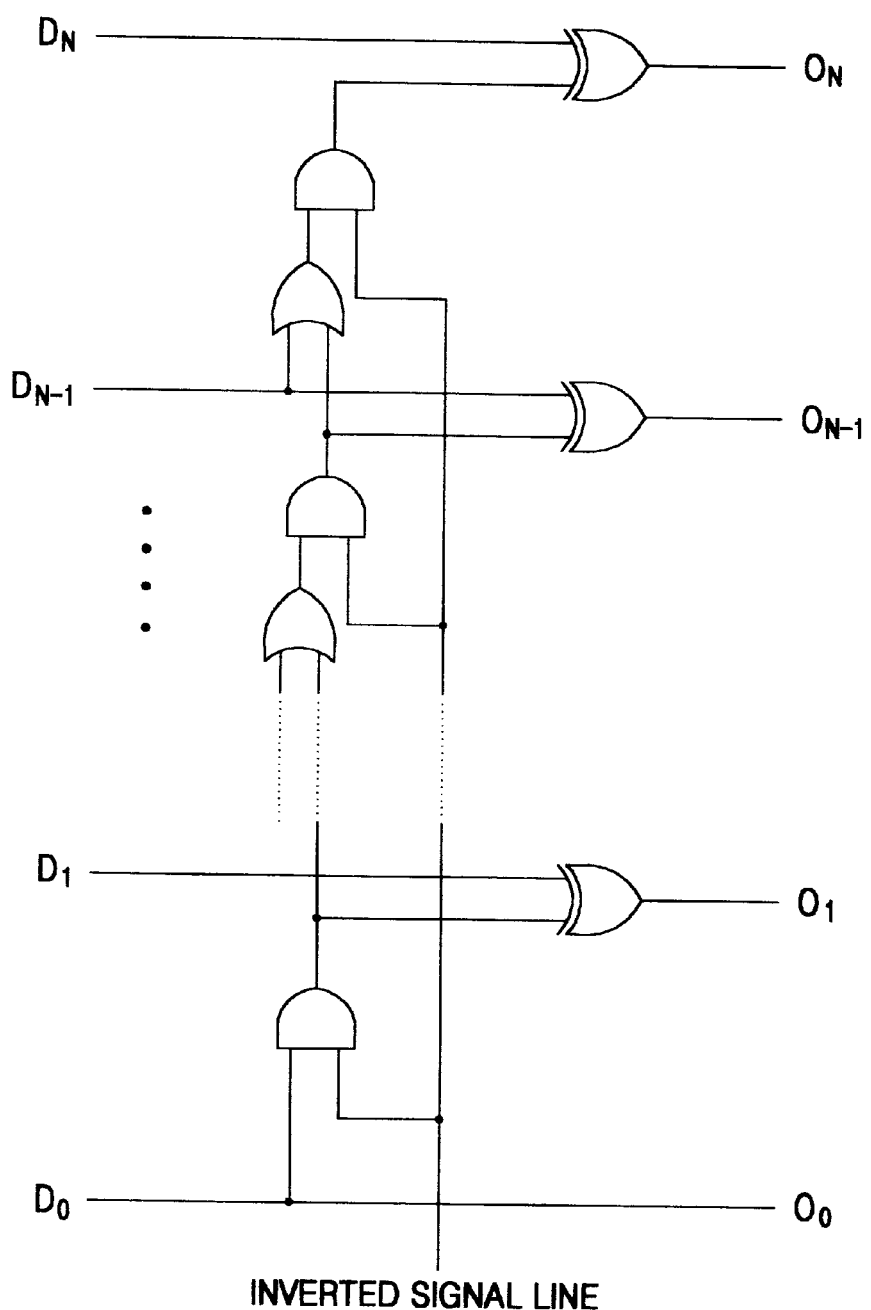
FIG. 4 is a circuit diagram illustrating a 2's complement according to the present invention.

When two ROMs are separated, since one carry occurs from each ROM, a predetermined adder which has two input carries is needed. This problem may be avoided by additionally using an adder which is capable of adding "1" or a circuit which is capable of generating 2' complement. In the present invention, one of the XOR gate groups which is capable of inverting the output from the ROM is changed. If the inverted control signal line is 1, the circuit which is shown in FIG. 4 and capable of directly computing 2's complement is used. The above-described function is implemented by simply adding a gate to an input portion of the XOR gate which is capable of inverting the output from the ROM for thus computing 2's complement.

Therefore, when comparing the hardware between the present invention and the conventional art, the sizes of the ROMs are identical in the present invention and the conventional art. In addition, in the present invention, the register 80 which is used in the conventional art and shown in FIG. 1 and the additional circuits (namely, the timing generator 81 of the conventional art) are not used. Furthermore, the multiplexer 22 which controls the input/output from the second ROM 32, the XOR gate group 51, and the control circuits 61a and 61b which are used for generating 2's complement are additionally used. In addition, two time of the number of the adders 40a and 40b are used, and the multiplexer 72 is used for storing the outputs into two registers 70a and 70b and sequentially outputting the thusly stored data. Therefore, the hardware are used twice. However, the modulation speed of the filter is increased four time. The performance is increased four time.

Figure 5:
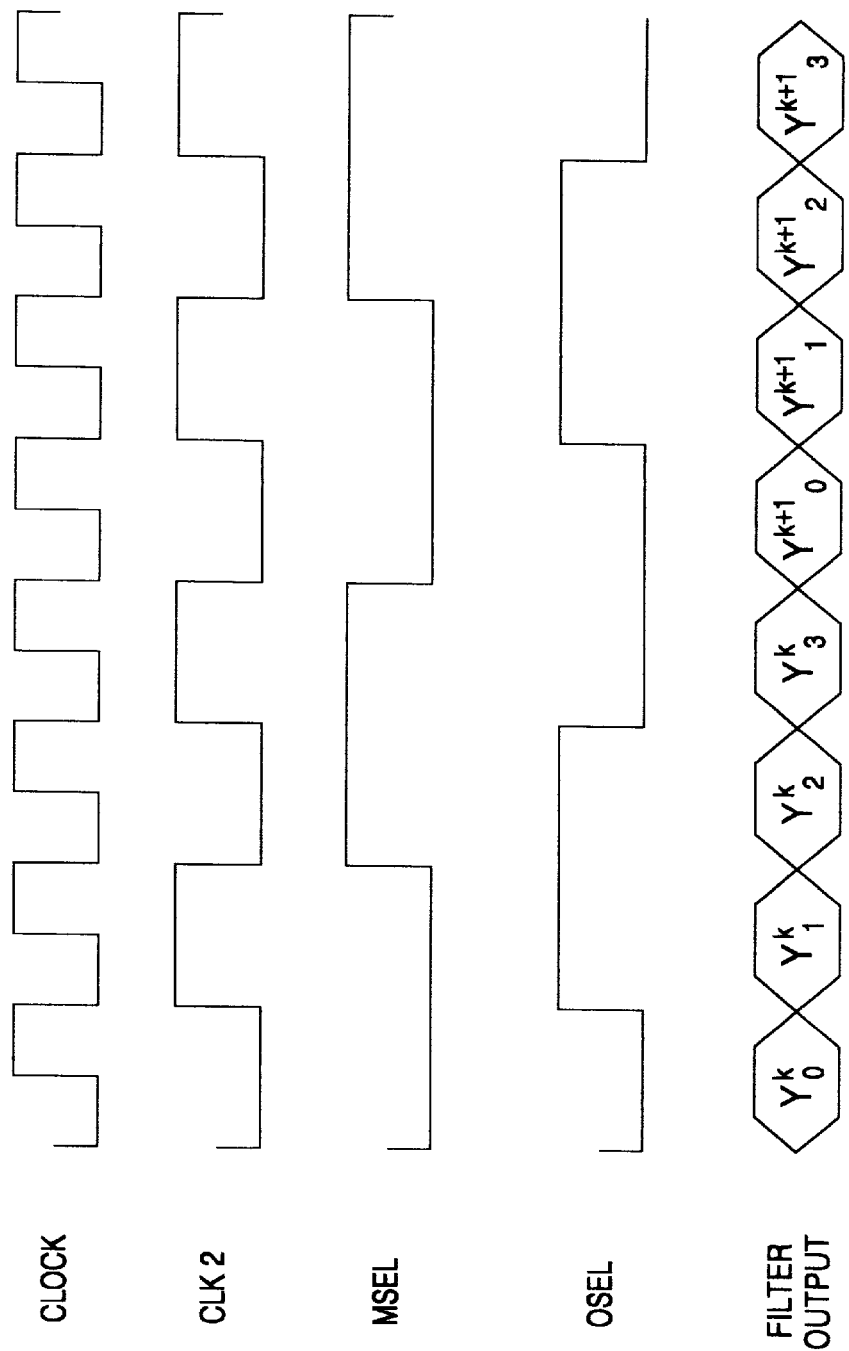
FIG. 5 is a wave form diagram of a signal of a 48-tap 1:4 interpolation Nyquist FIR filter according to the present invention.

FIG. 5 is a wave form diagram of a signal of a 48-tap 1:4 interpolation Nyquist FIR filter according to the present invention.

The clock signal CLOCK is a basic clock signal for controlling the entire operation of the filter. The signal "MSEL" which selected the output from the multiplexer is a four-divided clock signal of the clock signal CLOCK which is inputted into the wave form generator 73. If MSEL is 1, two input data are crossingly selected. This method acts to change the data inputted into the first ROM 31 and the second ROM 32, respectively. The signal "OSEL" which sequentially selects the outputs from two filters has a wave form which is obtained by XORing the two-divided clock signal CLK2 of the clock signal CLOCK inputted into the waveform generator 73 and the signal MSEL. When the signal is 0, a result which is obtained by summing the ROM$^0$ and ROM$^3$ is outputted, and when the signal is 1, a result which is obtained by summing the ROM$^1$ and ROM$^3$ is outputted. Since the wave form of "OSEL" is repeated as 0, 1, 1, 0, the output from the interpolation filter is sequentially generated by the combination of MSEL and OSEL at every basic clock signal.

Figure 2:
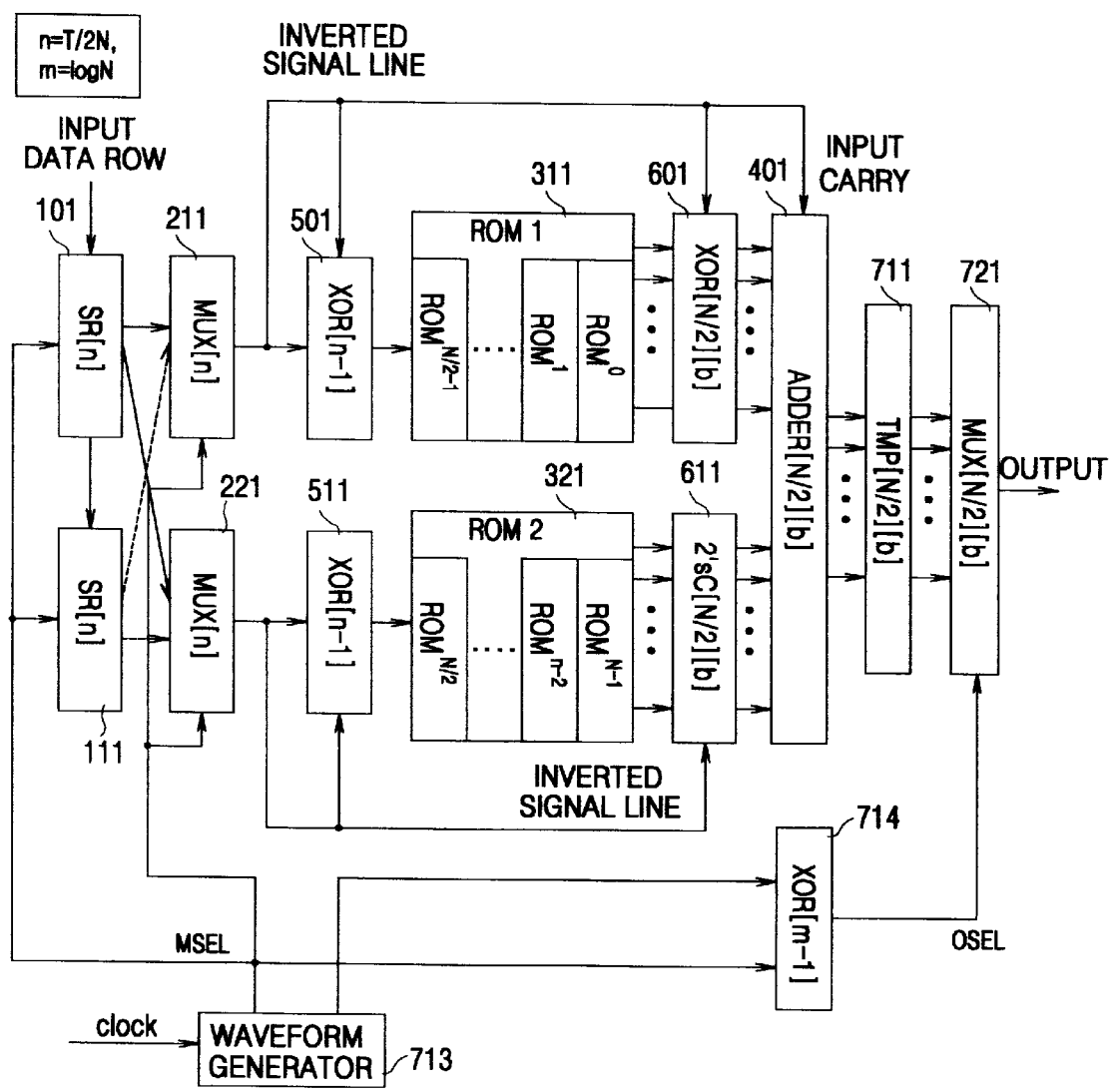
FIG. 2 is a block diagram illustrating a T-tap 1:N interpolation Nyquist FIR filter according to a first embodiment of the present invention.

FIG. 2 is a block diagram illustrating a T-tap 1:N interpolation Nyquist FIR filter according to a first embodiment of the present invention.

The N/2 number of ROM blocks which are arranged in the first portion and having the size of $2_{T/2N-1}$ which is identified by a filter coefficient C(k) (where k=0, ..., N−1) are combined in parallel and one ROM 311 the number of outputs is increased "N/2" time is configured. In addition, the remaining "N/2" number thereof is reversely combined for thus configuring a ROM 321. The output of each ROM block are inputted into the corresponding adder, and the N/2 number of the filters outputs are computed and stored in the output register. These outputs are sequentially outputted in the order which is determined by the multiplexer. In addition, there are the multiplexer which controls the input/output of the ROM, the XOR gate group and the adder. Since the descriptions thereof are identical to the embodiment of FIG. 3, the descriptions thereon will be omitted.

As described above, in the present invention, the digital modulation Nyquist FIR filter is used. Therefore, it is possible to increase the modulation speed by the interpolation ratio without increasing the operational frequency of the filter compared to the method of using a conventional FIR filter using one ROM. Accordingly, the high speed ROM-based Nyquist FIR filter according to the present invention is well adaptive to the modulation FIR filter of a broadband digital communication which requires a high speed data processing capability.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a high speed ROM-based Nyquist FIR filter having a T-tap 1:N interpolation ratio and total N×2$^{T/2N-1}$-sized ROMs(Read Only Memories), the improvements comprising:

a wave form generator for dividing an input clock signal and generating a control clock signal;

shift registers connected in series with each other for shifting a data inputted in accordance with the control clock signal;

a first multiplexer for crossingly selecting the output data shifted by the shift registers in accordance with the control clock signal;

first exclusive OR circuits for selectively inverting an address of each ROM in accordance with the inverted control signal selected by the first multiplexers;

two ROMs the size of each is half of the size of N×2$^{T/2N-1}$ in order to increase the number of outputs from the ROM;

second exclusive OR circuits for selectively inverting an internal result with respect to a row of a coefficient matrix stored in each ROM in accordance with the inverted control signal selected by the first multiplexers;

N/2 number of adders for receiving two groups of internal results which is concurrently read from each ROM selected by the second exclusive OR circuits and computing an N/2 number of series filter outputs at a time;

an output register for temporarily storing the computed filter outputs;

a third exclusive OR circuit for outputting a signal in order to sequentially select the filter outputs based on a logic combination of a control signal which is used for selecting a clock signal which is obtained by dividing a clock from the wave form generator and an output from the first multiplexer; and a second multiplexer for sequentially outputting filter outputs stored in the output register in accordance with a selection signal from the third exclusive OR circuit.

2. The filter of claim 1, wherein said two ROMs includes:

a first ROM for increasing the output by N/2 time by parallely combining the outputs wherein a N/2 number of ROM blocks share the same input address line; and a second ROM for increasing the outputs by two time by reversely combining the outputs of the remaining N/2 number of ROM blocks.

3. The filter of claim 1, wherein an N/2 number of adders is concurrently computing an N/2 number of internal results outputted in the order of two ROM internal blocks.

4. The filter of claim 1, wherein one of two second exclusive OR circuits is used as a circuit for computing 2's complement in accordance with an inverted signal.

* * * * *